United States Patent
Kessenger et al.

(10) Patent No.: US 9,123,057 B1
(45) Date of Patent: *Sep. 1, 2015

(54) METHOD AND APPARATUS OF PROCESSING DATA DISPLAYED ON A MOBILE STATION INTERFACE BASED ON USER PREFERENCES

(71) Applicant: West Corporation, Omaha, NE (US)

(72) Inventors: Erika Nelson Kessenger, Denver, CO (US); Bruce Pollock, Omaha, NE (US)

(73) Assignee: West Corporation, Omaha, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/495,969

(22) Filed: Sep. 25, 2014

Related U.S. Application Data

(63) Continuation of application No. 12/834,075, filed on Jul. 12, 2010, now Pat. No. 8,847,753.

(51) Int. Cl.
*G08B 1/08* (2006.01)
*G06Q 30/02* (2012.01)
*H04W 64/00* (2009.01)

(52) U.S. Cl.
CPC ........... *G06Q 30/0261* (2013.01); *H04W 64/00* (2013.01)

(58) Field of Classification Search
CPC .............................. G06F 3/0488; G06F 3/0486
USPC ............... 340/539.13, 539.1, 573.1; 455/412, 455/414, 419, 420

See application file for complete search history.

(56) References Cited

U.S. PATENT DOCUMENTS

| | | | |
|---|---|---|---|
| 5,400,246 A * | 3/1995 | Wilson et al. | 700/17 |
| 5,959,529 A * | 9/1999 | Kail, IV | 340/539.12 |
| 8,847,753 B1 * | 9/2014 | Kessenger et al. | 340/539.13 |
| 2006/0236258 A1 | 10/2006 | Othmer et al. | |
| 2008/0290987 A1 | 11/2008 | Li | |

* cited by examiner

*Primary Examiner* — Daryl Pope

(57) ABSTRACT

A method and apparatus of monitoring a mobile station's activity to determine user behavior is disclosed. One example method may include determining a location of the mobile station, and determining data that is accessible to the mobile station based on its location. The method may also include transmitting the data to the mobile station, tracking the movement of the mobile station over a specified time interval, and compiling a report of the mobile station's activity within the specified time interval.

20 Claims, 6 Drawing Sheets

METHOD AND APPARATUS OF PROCESSING DATA DISPLAYED ON A MOBILE STATION INTERFACE BASED ON USER PREFERENCES

CROSS-REFERENCE TO RELATED APPLICATIONS

This application is a continuation from U.S. patent application Ser. No. 12/834,075, filed Jul. 12, 2010, and entitled "METHOD AND APPARATUS OF PROCESSING DATA DISPLAYED ON A MOBILE STATION INTERFACE BASED ON USER PREFERENCES", which is incorporated by reference herein in its entirety.

TECHNICAL FIELD OF THE INVENTION

This invention relates to a method and apparatus of providing content data to a user of a mobile station, and, more particularly, to providing content data based on predefined user preferences for viewing such data and/or optimal settings associated with the user's mobile station.

BACKGROUND OF THE INVENTION

Currently, while mobile devices provide the capability to view content of various types, often times the content may not be optimized specifically for the mobile device being used. For example, user interface displays of mobile devices include varying sizes and accessibility options, which provide the user with limited options when downloading certain content, such as, web pages, pictures, videos, etc. Typically, a one-sized fits all approach is used, meaning that the content is displayed the same way and/or in the same format for all users of mobile devices. This leaves an individual user with no ability to specify viewing preferences in advance.

Users of mobile devices or mobile stations are increasingly relying on applications outside of voice. The newer mobile stations are sophisticated computing devices that are capable of accessing endless downloadable applications and providing other user features. Users vary in their specific preferences, needs and desires. One user may be a bargain shopper desiring to know when any and all of the nearby retailer locations offer opportunities to save money. In this example, the user would implement a GPS map application that is linked to a coupon list of bargains that vary on a day-to-day basis.

Other users may have one or two particular hotels and/or dining facilities that are always preferred when traveling. Such users may desire to know every opportunity such a favorite place appears nearby when traveling from city to city. Mobile station interface accessibility preferences (appearance, display, access options, etc.) and application preferences (coupons, specified retailers, etc.) may provide optimized user access of such features via their mobile station computing devices.

SUMMARY OF THE INVENTION

One example embodiment of the present invention may include a method of monitoring a mobile station's activity to determine user behavior. The method may include determining a location of the mobile station, and determining at least one content data that is accessible to the mobile station based on its location. The method may also include transmitting the at least one content data to the mobile station, and tracking the movement of the mobile station over a specified time interval. The method may further include compiling a report of the mobile station's activity within the specified time interval.

Another example embodiment of the present invention may include an apparatus configured to monitor a mobile station's activity to determine user behavior. The apparatus may include a processor configured to determine a location of the mobile station, and to determine at least one content data that is accessible to the mobile station based on its location. The apparatus may also include a transmitter configured to transmit the at least one content data to the mobile station. The processor is further configured to track the movement of the mobile station over a specified time interval, and compile a report of the mobile station's activity within the specified time interval.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
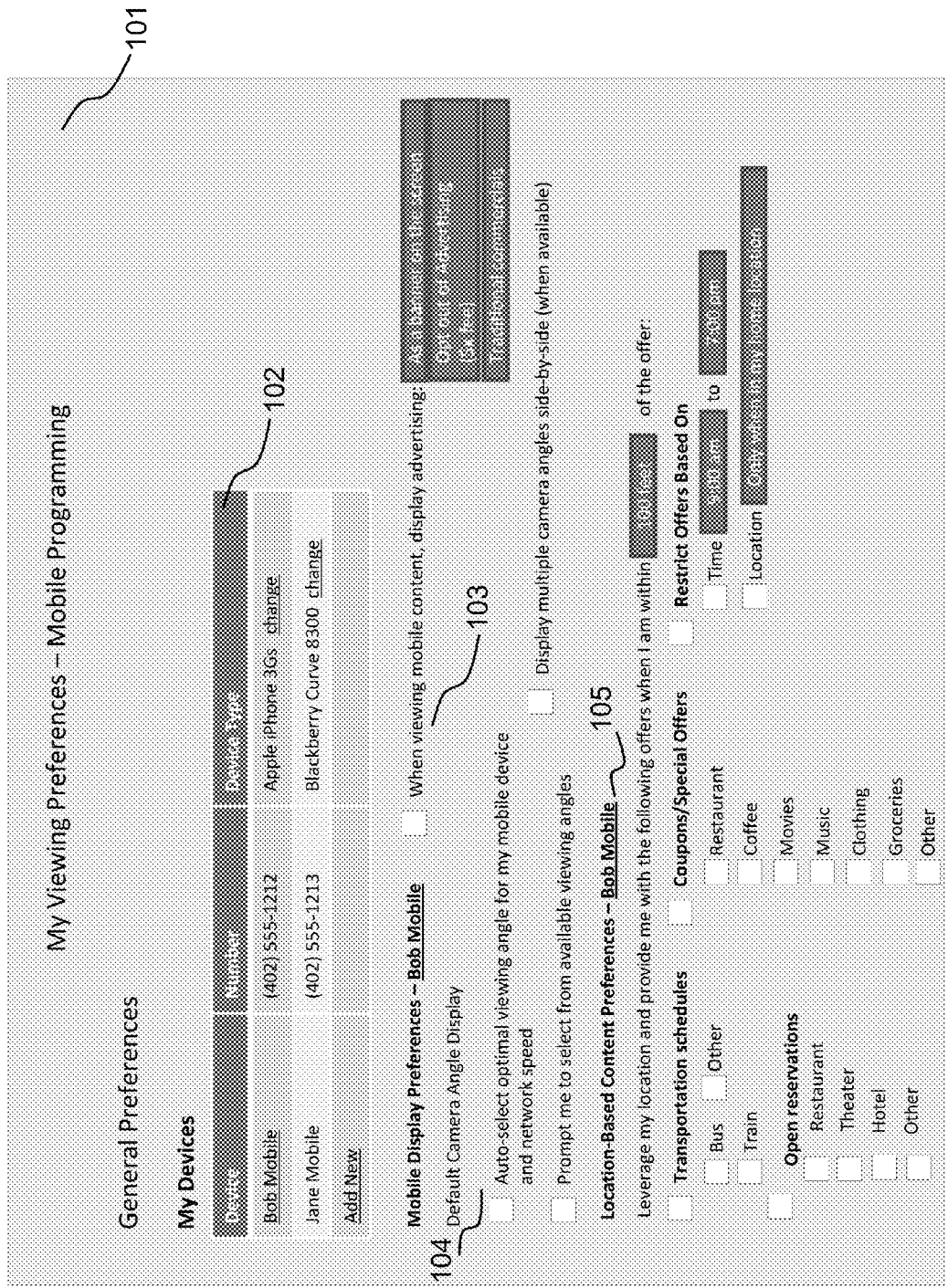
FIG. 1 illustrates an example screenshot of a user setup interface that may be used to setup viewing preferences, according to an example embodiment of the present invention.

FIG. 1 illustrates an example screenshot of a graphical user interface (GUI) that allows a user to enter specific preferences and user options, according to example embodiments of the present invention. Referring to FIG. 1, a screenshot 101 illustrates viewing preferences for a user of a mobile station. Initially, a user may enter a new mobile station and/or device at menu option 102. As may be viewed from the menu option 102, the user may enter more than one device identified by a name, such as, "Bob", "Jane", etc., and may also include, corresponding telephone numbers and/or device types. The user may access the menu via their mobile station, online and/or via a touch screen interface.

Menu option 103 illustrates an option to display advertising that may be included while viewing content data and/or other services that include advertising banners and/or commercials. In one example, the advertising may be displayed as a banner on the mobile station screen, such as, at the top, side and/or bottom of the screen borders. Another option may be to allow regular commercial advertising to take place. An additional option may be to opt out of advertising, which may incur a monetary fee.

Camera angles of the mobile station may also be setup based on user preferences. Menu option 104 provides a default camera angle display option for the camera of the mobile station. Some example default and/or user preferred camera angle options may include auto-selection of an optimal viewing angle, which may be based on the camera speed and/or the device type. Other options may include prompting the user to select an optimal viewing angle at the correct time, and offering the user several options side-by-side so that the user may select a viewing angle based on multiple possible selection options.

Additional menu options may include location-based content preferences at menu option 105. A first option within the content preferences may include a distance associated with a particular preference. For example, a user may desire to be notified when they are within 100, 200, 500 feet, a mile, 5 miles, 20 miles, etc., of a particular retailer (e.g., coffee, clothing, grocery, specialty store, etc.). Other options may include restrictions that limit the time and locations when the user preferred notifications are sent. For example, the user may only desire to be notified in their home location or when traveling since they are already familiar with their home location. Additionally, the user may only want the information during work hours and may not need notifications to be sent after work hours when they are at home or relaxing after work.

The user may also specify other options that are linked to the retailer preferences of menu option 105, such as, bus, subway, train schedules, etc. that coincide with traveling to and from their specified location preferences. The notifications may be sent that their favorite retailer is only 5 miles away and the bus could take them to the same shopping center along with a timetable to catch the bus. Other features may include user options to accept coupons from certain retailers and reservations for dinner, movies, etc.

When the user accesses the mobile content interface menu for the first time, an automated communication may be sent to their mobile device, which responds with the information specific to the device and/or related network parameters. The device and network parameters may then be stored within the preference management database. Initial network speed could be assessed on the device, and ongoing network speed would be validated in accordance with viewing preferences. On future visits, the device type may be validated, and, if it has changed, information regarding the new device may be stored in the preference management database of the central repository 203.

Information related to the network speed of the mobile station, the operating system, viewing interface type and size, and, preferences in general are used to construct/render a viewing interface for that specific user (including preferences regarding advertising, LBS, etc.). Certain constraints may also be recognized, such as, a small screen size or slow network speed, which would indicate whether a full-field camera angle may not work well on the mobile station.

Additional features may provide a user with the ability to change a camera angle, a viewing focus parameter, display components, etc., dynamically on the screen, via the phone-based interface. Such an interface may be a touch screen or other suitable interface that accepts user inputs. The user may also change his or her display preferences via the web interface on the user's mobile station. If a viewer chooses a sub-optimal viewing method/focus for their device type, certain viewing options may be suggested which are tailored to their device/parameters/network speed and other relevant factors.

Certain modifications that are made based on use preferences may include modifying an original hyper text markup language (HTML) code of a received content data, resizing images of the content data, converting a file type of the images of the content data, and modifying text formatting of the content data based on the predefined viewing preferences of the user.

Figure 2:
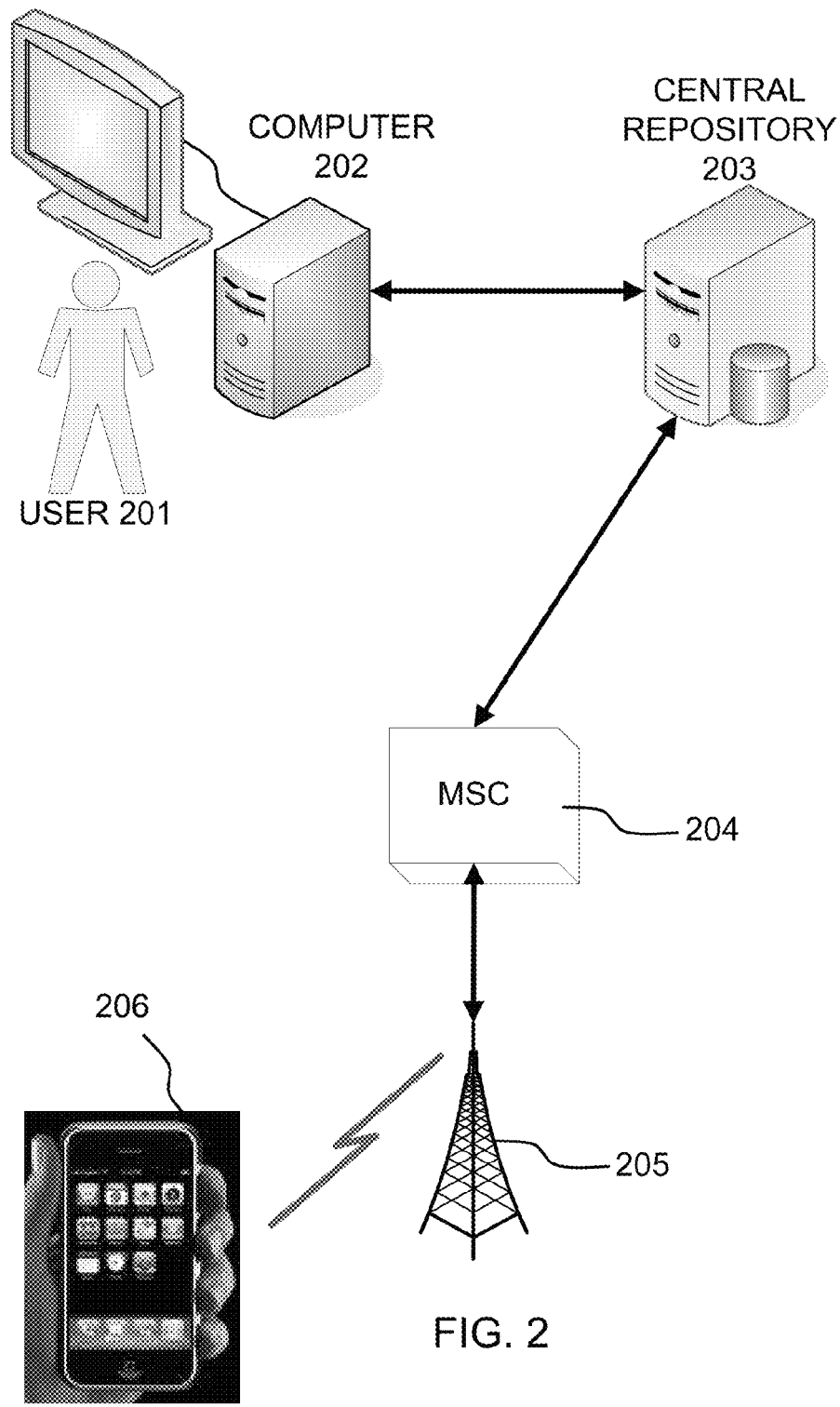
FIG. 2 illustrates a network configuration of a mobile station receiving content data, according to an example embodiment of the present invention.

FIG. 2 illustrates a network configuration, according to example embodiments of the present invention. Referring to FIG. 2, once the user preferences have been received, those results may be stored in a central repository database and/or server 203. The user 201 may enter the information into a computer 201 or a computing device/mobile station depending on the type of mobile station operated by the user. The central repository 203 may be a remote server database and/or a local computing device that is accessed to obtain the user's preferences.

The user may need to download a mobile application to his or her mobile station prior to accessing their preferences. A back-end server associated with the central repository 203 may be accessed to conduct a back-end lookup on the user's mobile phone type and network speed. The central repository may also store the phone type, operating system, network speed and other relevant parameters of the user's network and/or mobile station.

In operation, the user may be traveling along a highway with their mobile station 206 and may perform an operation that requires access to the user preferences stored in the central repository 203. Such an operation may include requesting local information about restaurants and/or hotel accommodations. Other example operations that require access to the user's preferences may be passive, such as, traveling into an area that is near one of the user's preferred retailers (e.g., a clothing store, coffee shop, etc.).

A base station 205 may communicate with a mobile switching center (MSC 204) to access the user's preferences from the central repository 203, which may be part of the MSC 204. Once the user's preferences are known, the base station may then transmit advertisement related information and/or a notification to the user that the preferred retailer is a specified distance away. User preferences may be stored remotely and/or may be cached locally in the user's mobile station. The user preferences may be sent before, after and during the transmission of content data to the user's mobile station. The preferences may be used to modify the content data before, after or during the transmission of the content data to the user's mobile station.

Figure 3A:
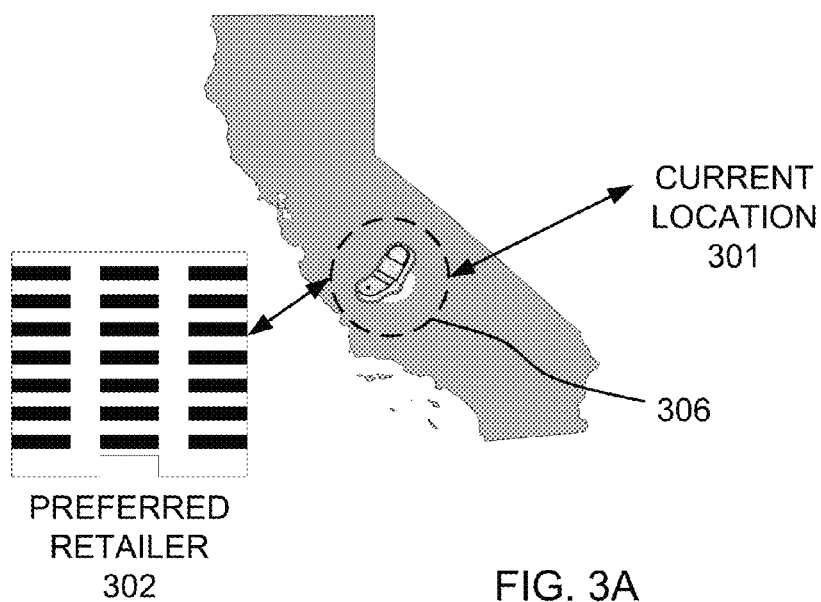
FIG. 3A illustrates a user's mobile station location providing certain user preference content data, according to an example embodiment of the present invention.

FIG. 3A illustrates an example of a user traveling through a particular geographical area, according to example embodiments of the present invention. Referring to FIG. 3A, a mobile station 206 is operating within a predefined geographical area 306, which may be the user's home area that he or she designated as the area desired to receive notifications consistent with the user's preferences. FIG. 3A illustrates a user's California home area 306, which designates a large portion of California's greater Los Angeles area. The user may work as a sales representative traveling along this area and greeting clients within this area. The preferences may be setup to provide the user with constant notifications regarding the user's favorite merchants, especially in areas where the user is has entered for the first time.

In one example, the mobile station 206 may have just traveled within 5 miles of his or her favorite clothing store (i.e., preferred retailer 302). The user may then receive the updated notification that presents a coupon or commercial to the user and turn-by-turn directions to the retailer's store address. Such notification information may all be part of the user's preferences. The data provided to the user may be referred to as content data, which may include, text, video, pictures, audio and/or other digital data transmitted to the user's mobile station.

Figure 3B:
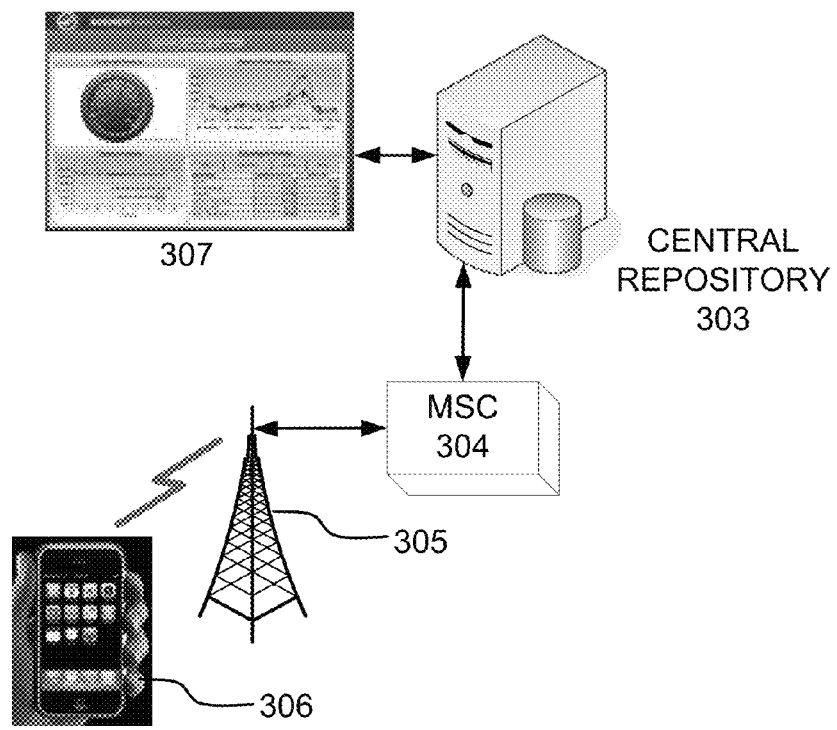
FIG. 3B illustrates an example network configuration that may be used to provide the user preference data to the user, according to an example embodiment of the present invention.

FIG. 3B illustrates a network configuration that may be used to transmit the content data to the user's mobile station. Referring to FIG. 3B, in association with FIG. 3A, once the user has entered the territory adjacent to the user's preferred retailer and designated by his or her preferences, certain content data may be accessed from a content server (not shown). The content data that exists for the user's preferred retailer may be requested from the central repository 303 and may then be processed at the data repository to be customized according to the user's preferences. Alternatively, the content data may be sent to the user's mobile switching center 304, base station 305 and/or directly to the user 306 before it is processed and customized to take into account the user preferences. Content data may be sent to the mobile station in association with an application being downloaded. The content data may be data that is part of the application itself and/or data that may be accessed and/or downloaded corresponding to the application.

Examples of user preferences may include display size of the advertisements, the types of advertisements, no advertisements (assuming a fee has been paid), display data type, volume on or off, and other features associated with the content data. Those preferences may be accessed from the memory of the central repository 303 and used to process and finalize the content data before sending it to the user's mobile station display. Alternatively, the preferences and content may be sent to the user's mobile station, and such processing and finalizing will be handled on the user's mobile station 306.

A back-end lookup on the user's mobile phone type and display content may be performed per the user's preferences. As mentioned previously, the user's preferences may be stored in the central repository database 303. However, if no preferences have been set, content may be displayed based on optimal viewing angles for that device. Ultimately, the content data may be modified to best accommodate the user whether it be based on the user's preferences and/or by a default automatic modification to the mobile data content.

During operation of the user preference application, the back-end server or central repository 303 maintains the information regarding the user's location and presence information. Such information may include the availability to receive specific information/content data, which may change as they are viewing content or performing other operations that modify the presence state of the mobile station 306. Examples of specific location information may include advertisements that are aimed at retailers within the nearby geographical area of the mobile station. Other examples may include location specific information, such as, a resort, casino and/or other large facility with its own targeted location specific information, which may not be accessible outside of a particular radius.

The user's location is monitored within a pre-defined timeframe and is used to query the repository 303 for available offers and content data. When a match exists, the application on the user's mobile device "wakes-up" and presents the location-based offer on the user's display.

Users of the user preference application will have the ability to receive relevant location-based information within their on-screen interface display (e.g. if they are near a large subway station, providing a link to the train schedule). This display will be based on the user's pre-defined preferences. In another example, the user visits retail locations and presents the offer displayed on their mobile station to receive the discount coupon. The user's activity, such as, purchasing, not purchasing, accessing the content data transmitted, etc. may be tracked over a predefined time interval and the results may be stored in memory and/or compiled into a data report.

The back end server/central repository 303 may further track the user behavior after the notification is recognized (i.e. did they visit the location?, what was purchased?, how long did it take to visit the location?, did they use the coupon offered?, etc.), and, those results are stored in the central repository 303. The results of the user behavior may be displayed on a graphical user interface/dashboard interface 307 operated by a user of the back-end server central repository 303. Such information may be used to offer future promotions to the user based on previously defined user preferences, and, in combination with the user's past behavior. For example, if the user has a history of responding to coffee discount advertisements, then retailers with built-in coffee shops may be advertised to the user in an effort to lure the user as a potential customer.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 4 illustrates an example network element 400, which may represent any of the above-described network components 202, 203, 204, 205, 206, 303, 304, 305 and 306.

Figure 4:
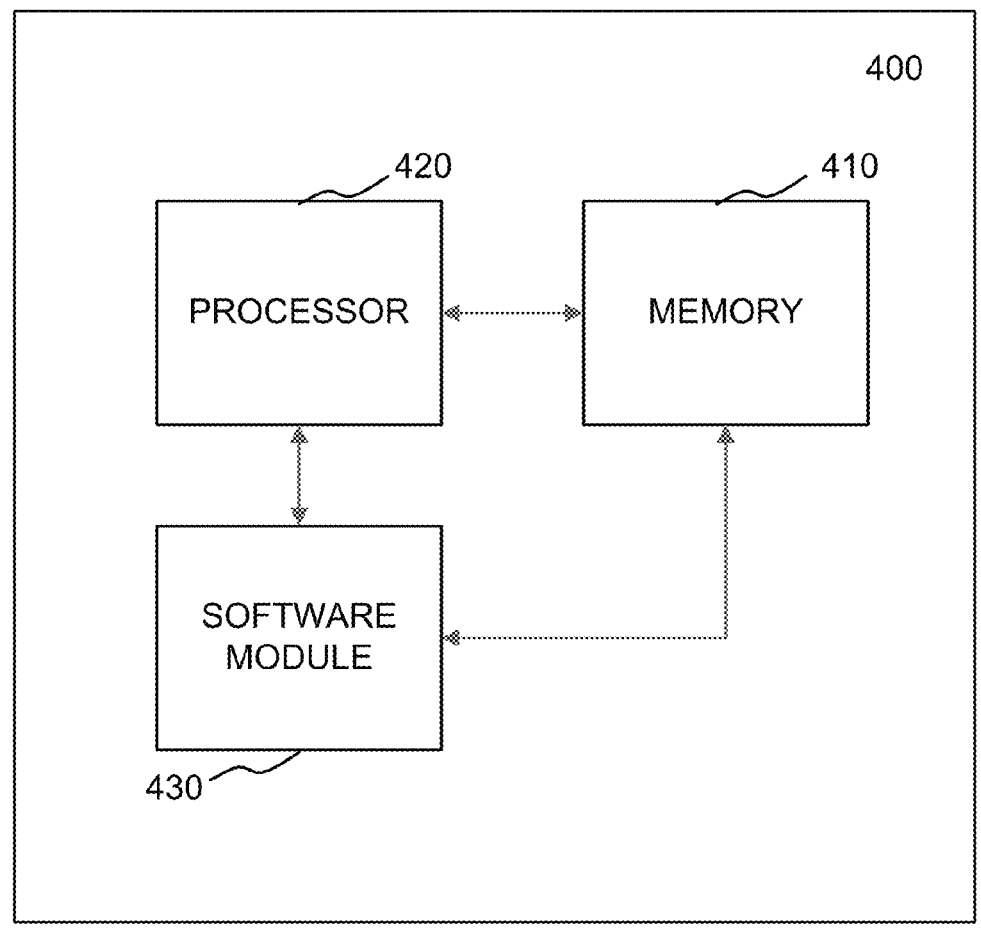
FIG. 4 illustrates an example network entity configured to provide the features of the present invention, according to an example embodiment of the present invention.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

Figure 5:
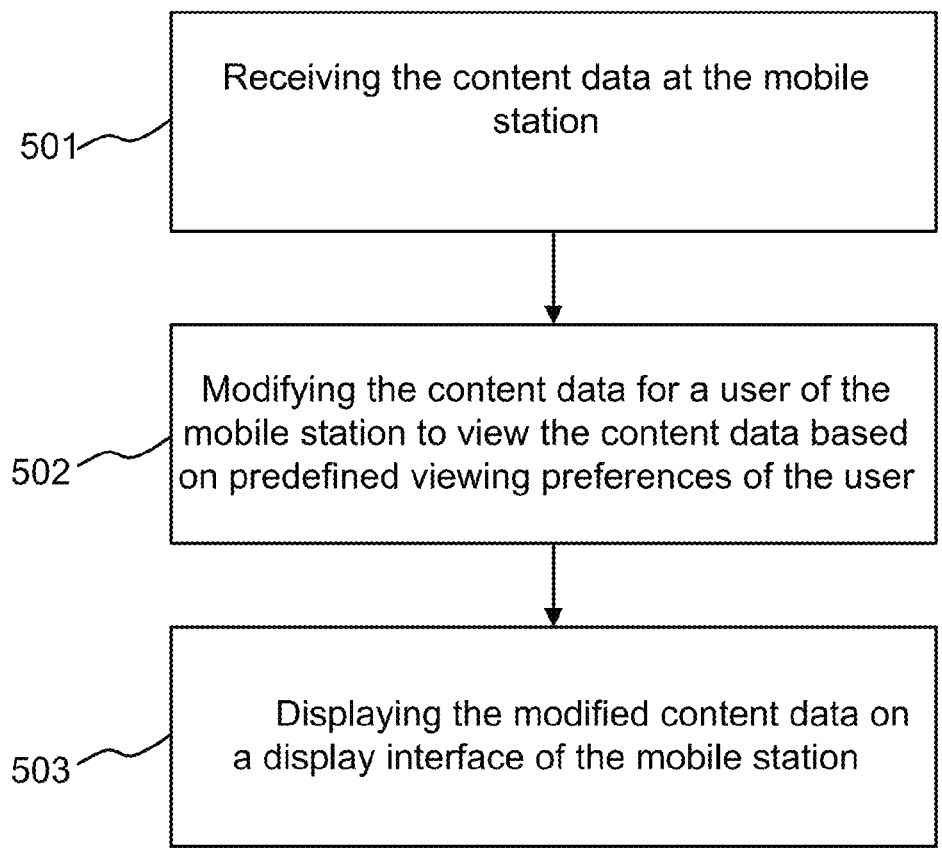
FIG. 5 is an example flow diagram illustrating an example method, according to an example embodiment of the present invention.

One example embodiment of the present invention may include a method of displaying customized content data on a mobile station. FIG. 5 illustrates an example flow diagram that discloses such a method. The method may include receiving the content data at the mobile station, at operation 501. Additional operations may include modifying the content data for a user of the mobile station to view the content data based on predefined viewing preferences of the user, at operation 502. Yet further operations may include displaying the modified content data on a display interface of the mobile station, at operation 503.

Figure 6:
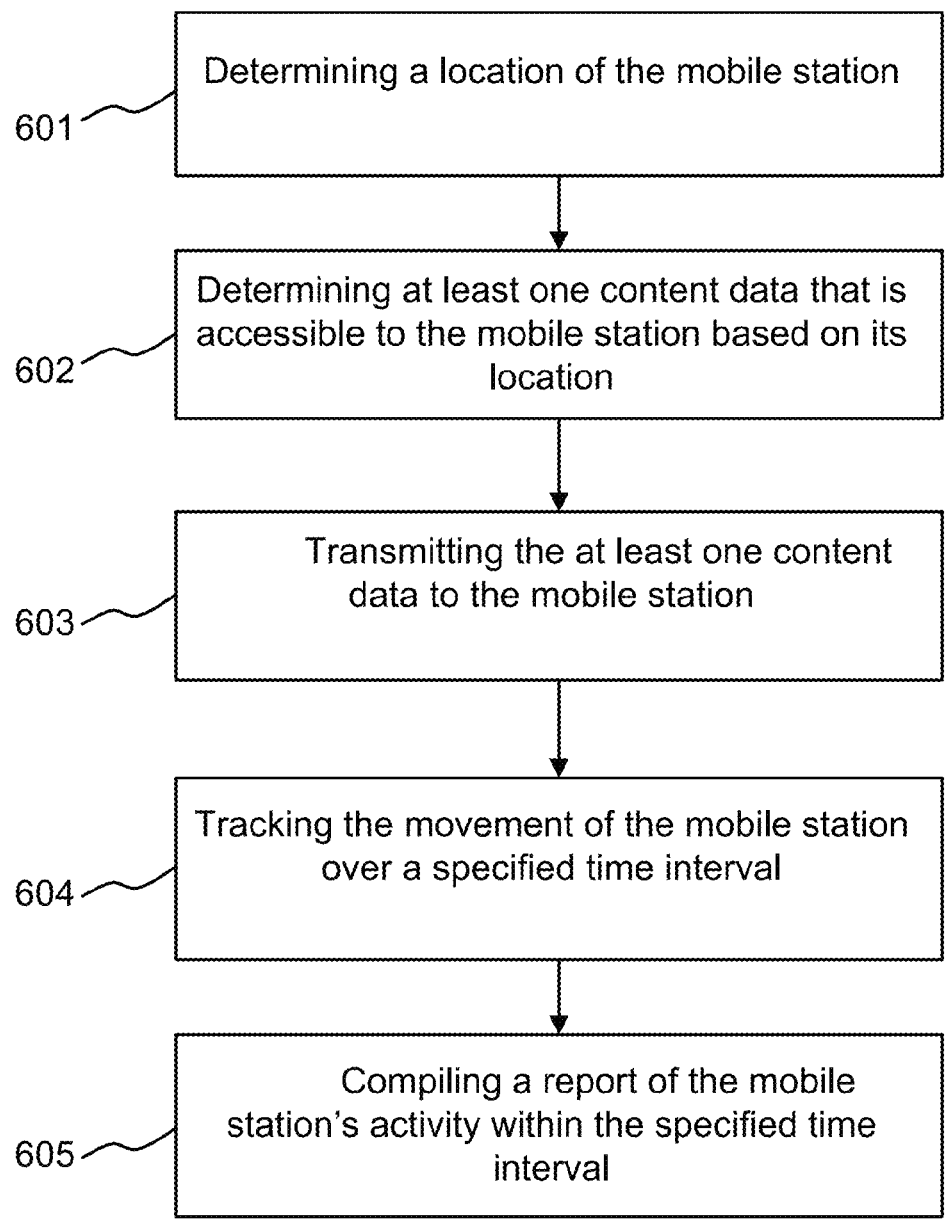
FIG. 6 is another example flow illustrating another example method, according to an example embodiment of the present invention.

Another example embodiment of the present invention may include a method of displaying customized content data on a mobile station. FIG. 6 illustrates an example flow diagram that discloses such a method. The method discloses monitoring a mobile station's activity to determine user behavior. The method may include determining a location of the mobile station, at operation 601. The method may also include determining at least one content data that is accessible to the mobile station based on its location, at operation 602. The method may further include transmitting the at least one content data to the mobile station, at operation 603. The method may also include tracking the movement of the mobile station over a specified time interval, at operation 604. The method may also include compiling a report of the mobile station's activity within the specified time interval, at operation 605.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    determining at least one content data that is accessible to a mobile station based on a location of the mobile station;
    querying a database for available content data to transmit to a user based on user preferences, wherein a first option within at least one predefined user preference among the user preferences comprises a distance associated with the at least one predefined user preference;
    transmitting the at least one content data to the mobile station, the at least one content data comprising a product purchase offer;
    tracking the movement of the mobile station over a specified time interval; and
    compiling a report of the mobile station's activity within the specified time interval, wherein the mobile station activity comprises accessing the at least one product purchase offer on the mobile station.

2. The method of claim 1 further comprising purchasing a corresponding product within the specified time interval.

3. The method of claim 1, further comprising:
    matching to the user's preferences at least one available offer or promotion that is presently available; and
    transmitting the at least one available offer or promotion as the content data to the mobile station.

4. The method of claim 3, further comprising:
    transmitting a wake-up signal to the user's mobile station when transmitting the at least one available offer or promotion as the content data to the mobile station to present the at least one available offer or promotion on a display of the user's mobile station.

5. The method of claim 1, wherein compiling a report of the user's activity comprises compiling at least one of purchasing, not purchasing, accessing the content data transmitted on the mobile station, and redeeming the at least one available offer or promotion.

6. The method of claim 5, further comprising:
    rematching to the user's preferences at least one available offer or promotion that is presently available; and
    transmitting the at least one available offer or promotion as the content data to the mobile station based on the user's activity included in the compiled report.

7. The method of claim 1, wherein the promotions and advertisements are transmitted in accordance with a downloaded application program stored on the mobile device.

8. An apparatus, comprising:
    a processor configured to determine at least one content data that is accessible to a mobile station based on a location of the mobile station, the at least one content data comprising a product purchase offer, and query a database for available content data to transmit to a user based on user preferences, wherein a first option within at least one predefined user preference among the user preferences comprises a distance associated with the at least one predefined user preference; and
    a transmitter configured to transmit the at least one content data to the mobile station, wherein the processor is further configured to track the movement of the mobile station over a specified time interval, and compile a report of the mobile station's activity within the specified time interval, wherein the mobile station activity comprises an access of the at least one product purchase offer on the mobile station.

9. The apparatus of claim 8 wherein the processor is further configured to purchase of a corresponding product within the specified time interval.

10. The apparatus of claim 8, wherein the processor is further configured to match to the user's preferences at least one available offer or promotion that is presently available, and the transmitter is further configured to transmit the at least one available offer or promotion as the content data to the mobile station.

11. The apparatus of claim 10, wherein the transmitter is further configured to transmit a wake-up signal to the user's mobile station when the at least one available offer or promotion is transmitted as the content data to the mobile station to present the at least one available offer or promotion on a display of the user's mobile station.

12. The apparatus of claim 8, wherein the report of the user's activity being compiled comprises a compilation of at least one of purchasing, not purchasing, accessing the content data transmitted on the mobile station, and a redemption of the at least one available offer or promotion.

13. The apparatus of claim 12, wherein the processor is further configured to rematch to the user's preferences at least one available offer or promotion that is presently available, and the transmitter is further configured to transmit the at least one available offer or promotion as the content data to the mobile station based on the user's activity included in the compiled report.

14. The apparatus of claim 8, wherein the promotions and advertisements are transmitted in accordance with a downloaded application program stored on the mobile device.

15. A non-transitory computer readable storage medium configured to store a computer program that when executed causes a processer to perform:
   determining at least one content data that is accessible to a mobile station based on a location of the mobile station, the at least one content data comprising a product purchase offer;
   querying a database for available content data to transmit to a user based on user preferences, wherein a first option within at least one predefined user preference among the user preferences comprises a distance associated with the at least one predefined user preference;
   transmitting the at least one content data to the mobile station;
   tracking the movement of the mobile station over a specified time interval; and
   compiling a report of the mobile station's activity within the specified time interval, wherein the mobile station activity comprises accessing the at least one product purchase offer on the mobile station.

16. The non-transitory computer readable storage medium of claim 15, wherein the processor is further configured to perform purchasing a corresponding product within the specified time interval.

17. The non-transitory computer readable storage medium of claim 15, wherein the processor is further configured to perform:
   matching to the user's preferences at least one available offer or promotion that is presently available; and
   transmitting the at least one available offer or promotion as the content data to the mobile station.

18. The non-transitory computer readable storage medium of claim 17, wherein the processor is further configured to perform:
   transmitting a wake-up signal to the user's mobile station when transmitting the at least one available offer or promotion as the content data to the mobile station to present the at least one available offer or promotion on a display of the user's mobile station.

19. The non-transitory computer readable storage medium of claim 15, wherein compiling a report of the user's activity comprises compiling at least one of purchasing, not purchasing, accessing the content data transmitted on the mobile station, and redeeming the at least one available offer or promotion.

20. The non-transitory computer readable storage medium of claim 19, wherein the processor is further configured to perform:
   rematching to the user's preferences at least one available offer or promotion that is presently available; and
   transmitting the at least one available offer or promotion as the content data to the mobile station based on the user's activity included in the compiled report.

\* \* \* \* \*